(12) United States Patent
Ishii

(10) Patent No.: US 8,996,214 B2
(45) Date of Patent: Mar. 31, 2015

(54) HYBRID WORKING VEHICLE

(75) Inventor: Norihiro Ishii, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 250 days.

(21) Appl. No.: 13/601,696

(22) Filed: Aug. 31, 2012

(65) Prior Publication Data

US 2013/0066496 A1 Mar. 14, 2013

(30) Foreign Application Priority Data

Sep. 8, 2011 (JP) ................. 2011-196307

(51) Int. Cl.
*B60L 11/00* (2006.01)
*B60K 6/485* (2007.10)
*B60W 10/103* (2012.01)
*B60W 10/30* (2006.01)
*B60W 20/00* (2006.01)
*B60W 30/188* (2012.01)

(52) U.S. Cl.
CPC .............. *B60K 6/485* (2013.01); *B60W 10/103* (2013.01); *B60W 10/30* (2013.01); *B60W 20/00* (2013.01); *B60W 30/1888* (2013.01); *Y02T 10/6226* (2013.01)
USPC ....... 701/22; 701/55; 180/65.22; 180/65.265; 180/253; 180/294; 180/443; 104/119; 475/5; 62/236

(58) Field of Classification Search
USPC .............. 701/22, 55; 180/65.22, 65.265, 253, 180/294, 443; 104/119; 475/5; 62/236
See application file for complete search history.

(56) References Cited

U.S. PATENT DOCUMENTS

| | | | | |
|---|---|---|---|---|
| 3,518,945 A | * | 7/1970 | Elmore et al. | 104/119 |
| 3,865,207 A | * | 2/1975 | Schwab et al. | 180/253 |
| 2004/0254695 A1 | * | 12/2004 | Komiyama et al. | 701/22 |
| 2005/0079942 A1 | * | 4/2005 | Bauknecht et al. | 475/5 |
| 2008/0251311 A1 | * | 10/2008 | Waibel et al. | 180/443 |
| 2009/0018716 A1 | * | 1/2009 | Ambrosio | 701/22 |
| 2009/0088937 A1 | * | 4/2009 | Matsubara et al. | 701/55 |
| 2009/0095549 A1 | * | 4/2009 | Dalum et al. | 180/65.265 |
| 2010/0084211 A1 | * | 4/2010 | Seidel et al. | 180/294 |
| 2010/0154449 A1 | * | 6/2010 | Stover et al. | 62/236 |
| 2010/0168969 A1 | * | 7/2010 | Inagaki et al. | 701/55 |
| 2010/0219007 A1 | * | 9/2010 | Dalum et al. | 180/65.22 |
| 2012/0290158 A1 | * | 11/2012 | Yoshikawa | 701/22 |

FOREIGN PATENT DOCUMENTS

JP 2007-269072 10/2007

* cited by examiner

*Primary Examiner* — James Trammell
*Assistant Examiner* — Sanjeev Malhotra
(74) *Attorney, Agent, or Firm* — Sterne, Kessler, Goldstein & Fox, P.L.L.C.

(57) ABSTRACT

A hybrid working vehicle comprises an engine, a drive wheel, a power take-off (PTO) shaft, and a power transmission system for transmitting power from the engine to the drive wheel and the PTO shaft. The power transmission system is bifurcated at a bifurcating point into a traveling drive train for driving the drive wheel and a PTO drive train for driving the PTO shaft. A continuously variable transmission is provided on the traveling drive train, and a motor generator is provided on the power transmission system between the engine and the bifurcating point. The motor generator functions as a generator by power of the engine and functions as an electric motor for driving the power transmission system. The hybrid working vehicle includes a controller for controlling an output rotary speed of the motor generator functioning as the electric motor.

8 Claims, 11 Drawing Sheets

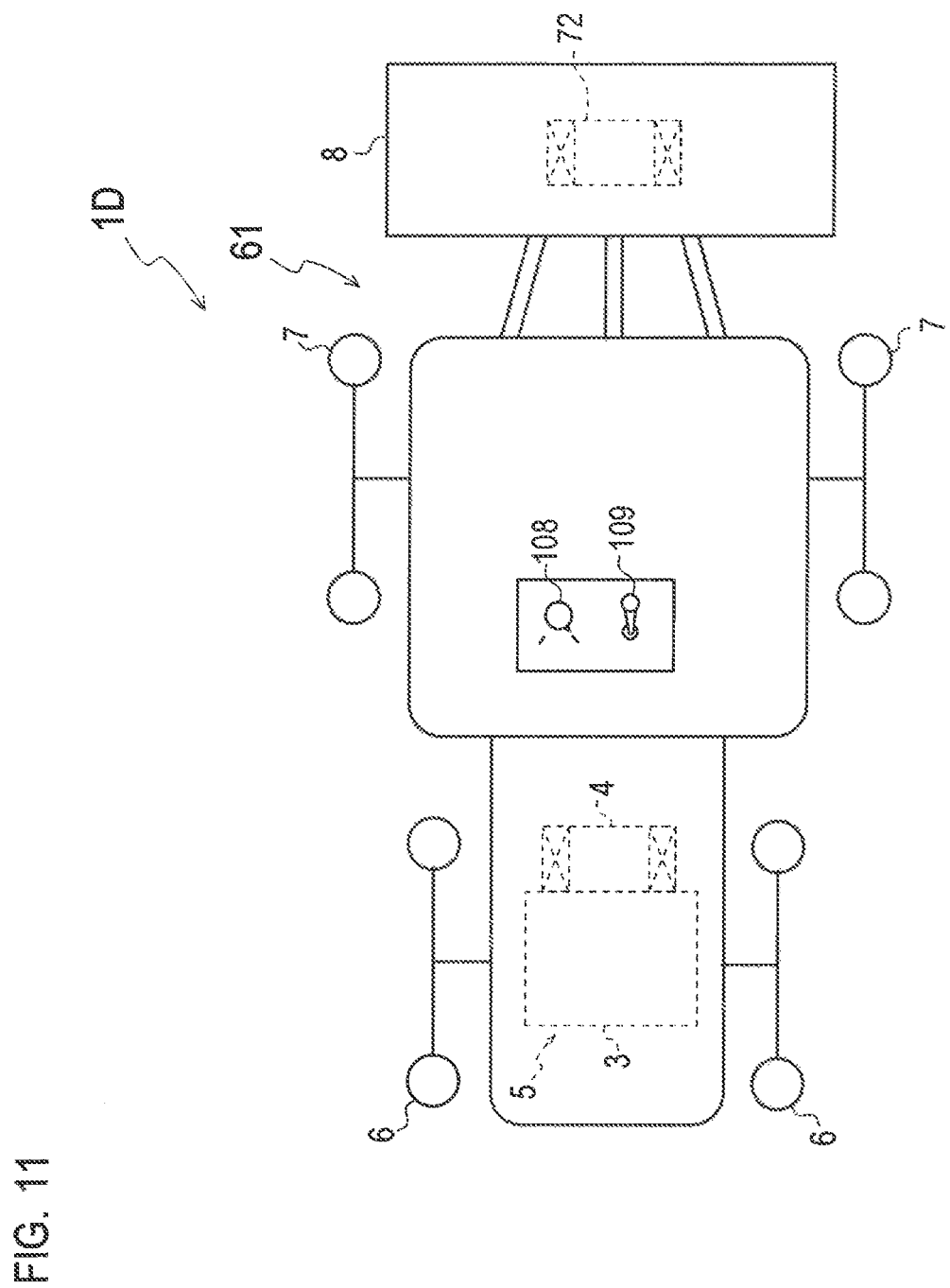

HYBRID WORKING VEHICLE

BACKGROUND OF THE INVENTION

1. Technical Field

The present invention relates to a hybrid working vehicle having an engine and an electric motor for driving a drive wheel and a power take-off (PTO) shaft.

2. Related Art

Recently, as disclosed by JP 2007-269072 A, a hybrid drive system including an engine, a generator driven by the engine, and electric motors driven by electric power generated by the generator is used by working vehicles, e.g., construction machines and agricultural machines, as well as motorcars. A working vehicle using this hybrid drive system selects either the engine power or the electric motor power so as to drive front and rear drive wheels and its PTO shaft, thereby achieving various driving modes in travel of the vehicle and in work by drive of the PTO shaft.

In this regard, the electric motors can change their output rotary speeds steplessly (continuously). In other words, the output rotary speeds of the electric motors do not change sharply. On the other hand, the output rotary speed of the engine is almost kept constant during travel or work of the vehicle. Therefore, to change the traveling speed of the vehicle based on the engine power, a gear transmission on a traveling drive train for transmitting the engine power to drive wheels must be gear-shifted. Further, to change the drive speed of the PTO shaft based on the engine power, a gear transmission on a PTO drive train for transmitting the engine power to the PTO shaft must be gear-shifted. The gearshift of these gear transmissions is stepwise. For example, during the gearshift from a high speed stage to a low speed stage, the traveling speed of the vehicle reduces considerably sharply. Accordingly, in a comparison between the engine-powered traveling or working state and the electric motor powered traveling or working state, there is a great difference in speed changing pattern during travel or work of the vehicle or in an operator's feeling of operation for speed change of traveling or work of the vehicle. Therefore, the traveling speed of the vehicle and the drive speed of the working implement of the vehicle are desired to be changed steplessly and smoothly regardless of whether the driving of the drive wheels or the working implement is caused by the engine power or the electric motor power.

Further, the output power of the electric motor for traveling of a vehicle is inputted to downstream portions of the traveling drive train while the engine power is canceled. On the other hand, the output power of the electric motor for PTO driving is inputted to an intermediate portion of the PTO drive train while the engine power is canceled. Therefore, an electric motor for driving rear wheels, an electric motor for driving front wheels and an electric motor for PTO driving are necessary, thereby increasing the number of parts and costs and inhibiting minimization of the vehicle.

Further, as disclosed by the above-mentioned prior art document, the convenient hybrid working vehicle alternately transmits either the engine output power or the electric motor output power to the drive wheels or the PTO shaft. In other words, since the electric motor power cannot be combined with the engine power, the function of the electric motor for assisting the engine in torque cannot be effectively exerted during starting or acceleration of the vehicle by use of the engine power or during high loaded work of the working implement by use of the engine power, thereby increasing loss of torque and energy. In this way, the problem of the conventional hybrid working vehicle is its insufficient effect in energy saving and in leveling the engine load.

SUMMARY OF THE INVENTION

An object of the invention is to provide a hybrid working vehicle which can steplessly speed-shift during traveling or working by use of engine power and can combine the electric motor power and the engine power so as to effectively assist the engine torque, thereby reducing energy loss and ensuring compactness and economy of the vehicle.

To achieve the above-mentioned object, a hybrid working vehicle of the invention comprises an engine, a drive wheel, a power take-off (PTO) shaft, and a power transmission system for transmitting power from the engine to the drive wheel and the PTO shaft. The power transmission system is bifurcated at a bifurcating point into a traveling drive train for driving the drive wheel and a PTO drive train for driving the PTO shaft. The hybrid working vehicle further comprises a continuously variable transmission, a motor generator and a controller. The continuously variable transmission is provided on the traveling drive train. The motor generator is provided on the power transmission system between the engine and the bifurcating point. The motor generator functions as a generator driven by the engine to charge electric power in a battery or functions as an electric motor supplied with electric power from the battery to drive the power transmission system. The controller is provided for controlling an output rotary speed of the motor generator functioning as the electric motor.

Due to the above-mentioned structure, the hybrid working vehicle brings the following effects: When the motor generator functions as the electric motor, the motor generator combines its steplessly speed-variable output power with the output power of the engine and transmits the combined steplessly speed-variable output power to the drive wheel via the traveling drive train and to the PTO shaft via the PTO drive train in the condition that the drive wheel and the PTO shaft are disposed at the downstream sides of the motor generator via the traveling drive train and the PTO drive train. Therefore, when the working vehicle starts traveling or accelerates or when the working implement drivingly connected to the PTO shaft works, the output speed of the motor generator functioning as the electric motor is adjusted so as to steplessly change the traveling speed of the vehicle and the driving speed of the working implement so as to improve the speed-shift operability for either traveling or working. Further, the output power of the motor generator functioning as the electric motor effectively assists the output torque of the engine so as to greatly effect in saving energy and in leveling engine load, and so as not to need individual electric motors for driving the respective drive wheels and the PTO shaft, thereby reducing the number of parts and costs and minimizing the vehicle. Further, from the viewpoint of torque performance, it may be considered that only the output power of the engine is used (i.e., the engine and electric powers are not combined) for driving the drive wheel during high speed traveling of the vehicle. However, in this case, the continuously variable transmission on the traveling drive train transmits its steplessly speed-variable output power to the drive wheel, thereby steplessly speed-shifting the drive wheel and thereby ensuring the same feeling as that in travel by use of the combined power.

The hybrid working vehicle according to the invention farther comprises a second transmission and a first electric motor. The second transmission is provided on the traveling drive train. The second transmission includes a transmission clutch interposed between an upstream side drive member drivingly connected to the engine and a downstream side drive member drivingly connected to the drive wheel. The first electric motor is drivingly connected to the downstream side drive member and is driven by the electric power supply from the battery. When the transmission clutch of the second transmission is engaged to drivingly connect the upstream side drive member to the downstream side drive member, the controller controls an output rotary speed of the first electric motor so as to drive the downstream side drive member synchronously to the upstream side drive member.

Therefore, electric power that is generated by the motor generator and that is charged in the battery is used to drive the first electric motor so as to engage the transmission clutch when the rotary speed of the downstream side drive member is synchronized to that of the upstream side drive member, thereby smoothly and silently connecting the downstream side drive member to the upstream side drive member. Therefore, the transmission clutch does not need a complicated synchromesh system. A clutch that has a shock when it is engaged, such as a dog clutch, may be used as the transmission clutch, thereby reducing costs and improving mainteanceability.

In the hybrid working vehicle according to the invention, the drive wheel driven by the traveling drive train is defined as a main drive wheel. The hybrid working vehicle further comprises an auxiliary drive wheel and a second electric motor drivingly connected to the auxiliary drive wheel and driven by the electric power supply from the battery. The controller controls the driving on-and-off of the second electric motor so as to select either a four-wheel drive mode to drive the main and auxiliary drive wheels or a two-wheel drive mode to drive only the main drive wheel.

Therefore, the electric power generated by the motor generator and charged in the battery is used to drive the second electric motor, thereby driving the auxiliary drive wheel by the steplessly speed-variable output power of the second electric motor. Therefore, the main drive wheel and the auxiliary drive wheel can be steplessly speed-shifted during travel of the vehicle in the four-wheel drive mode. The vehicle needs no drive train for drivingly connecting the above-mentioned power transmission system to the auxiliary drive wheel, thereby reducing the number of parts and costs and minimizing the vehicle.

The hybrid working vehicle according to the invention further comprises a differential speed detection means for detecting a differential peripheral speed between the main drive wheel and the auxiliary drive wheel. During travel of the hybrid working vehicle in the two-wheel drive mode, when the differential peripheral speed detected by the differential speed detection means exceeds a threshold, the controller supplies electric power from the battery to the second electric motor for driving the auxiliary drive wheel so as to change the two-wheel drive mode to the four-wheel drive mode.

Therefore, for example, in a case where an agricultural vehicle serves as the hybrid working vehicle and the two-wheel drive mode is selected for movement of the vehicle on road among fields, when the auxiliary drive wheel slips so that the differential peripheral speed between the main drive wheel and the auxiliary drive wheel exceeds the threshold, the drive mode of the vehicle can be automatically shifted to the four-wheel drive mode so as to enable the vehicle to escape from the slipping condition, thereby enabling traveling performance of the vehicle on a soft ground or so on.

The hybrid working vehicle according to the invention further comprises an auxiliary clutch interposed between the second electric motor and the auxiliary drive wheel. The auxiliary clutch is disengaged when the electric power supply to the second electric motor is stopped.

In this regard, even if the electric power supply to the second electric motor is stopped, the output shaft of the second electric motor rotates following the inertial rotation of the auxiliary drive wheel so as to reduce the durability of the second electric motor while the output shaft of the second electric motor is drivingly connected to the auxiliary drive wheel. Therefore, due to the above-mentioned configuration that the auxiliary clutch is disengaged when this electric power supply is stopped, the output shaft of the second electric motor is prevented from rotating following the inertial rotation of the auxiliary drive wheel, thereby improving the durability of the second electric motor.

The auxiliary clutch is a one-way clutch.

Therefore, the auxiliary clutch does not have a rotation resistance such as a dragging torque caused if the auxiliary clutch is a friction clutch, thereby effectively preventing the second electric motor from rotating following the inertial rotation of the auxiliary drive wheel, and thereby improving the durability of the second electric motor.

Alternatively, the auxiliary clutch is a bi-directional clutch that can be operated regardless of whether the auxiliary drive wheel rotates in the forward traveling direction or the backward traveling direction.

Therefore, the second electric motor is protected from rotating following inertial rotation of the auxiliary drive wheel regardless of whether the vehicle travels forward or backward, thereby further improving the durability of the second electric motor. Further, in comparison with the case where a one-way clutch serving as the auxiliary clutch must be paired to bring its effect to the vehicle traveling forward and backward, the bi-directional clutch does not have to be paired for both forward travel and backward travel, thereby reducing the number of parts and costs.

In the hybrid working vehicle according to the invention, the auxiliary drive wheel is steerable. The hybrid working vehicle further comprises a turn angle detection means for detecting a turn angle of the auxiliary drive wheel. When the turn angle of the auxiliary drive wheel detected by the turn angle detection means exceeds a threshold, the controller commands the second electric motor to increase the output rotary speed so as to make a peripheral speed of the auxiliary drive wheel exceed a peripheral speed of the main drive wheel.

Therefore, when the turn angle exceeds the threshold, the auxiliary drive wheel is automatically accelerated to turn the vehicle, so that the main drive wheel or the auxiliary drive wheel can be prevented from slipping or dragging during turning of the vehicle, thereby improving the turning performance of the vehicle traveling in the four-wheel drive mode.

BRIEF DESCRIPTION OF THE DRAWINGS

FIG. 11 is a plan view of a hybrid working vehicle 1D showing an arrangement of power sources.

DETAILED DESCRIPTION OF THE INVENTION

Figure 1:
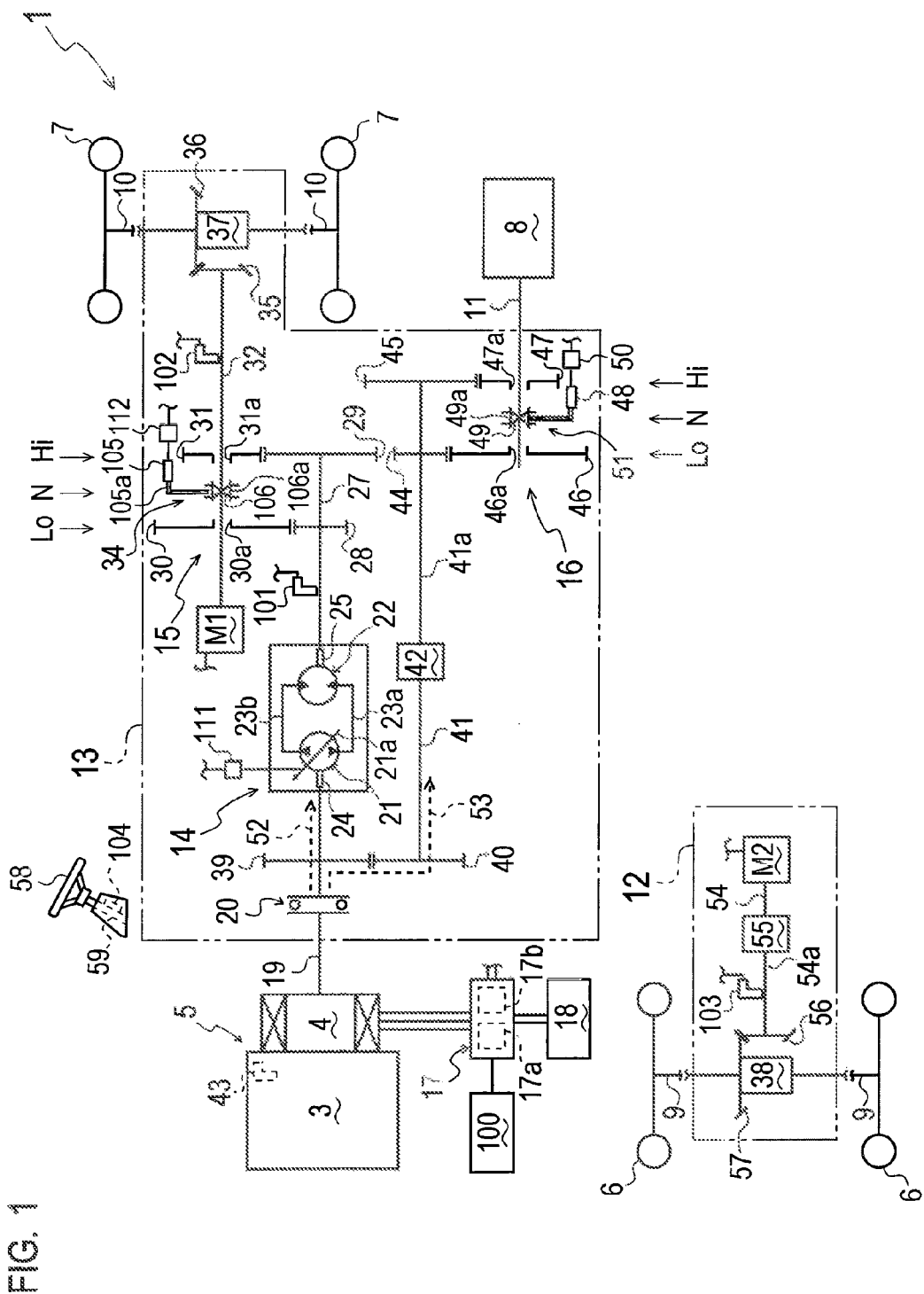
FIG. 1 is a skeleton diagram of a hybrid working vehicle 1 according to the present invention showing a power transmission system.

Referring to FIG. 1, a general construction of a hybrid working vehicle 1 will be described. Vehicle 1 is a four-wheel drive tractor that is equipped with a power unit 5 including an engine (internal combustion engine) 3 and a motor generator 4. Vehicle 1 is equipped at a front portion thereof with a front transaxle 12, and is equipped at a rear portion thereof with a rear transaxle 13. Front transaxle 12 supports right and left front axles 9, and right and left front drive wheels 6 are provided on distal ends of respective front axes 9. Rear transaxle 13 supports right and left rear axles 10, and right and left rear drive wheels 7 are provided on distal ends of respective rear axles 10. Rear transaxle 13 also supports a rearwardly projecting PTO shaft 11 for driving a working implement 8, e.g., a rotary cultivator, connected to a rear end of PTO shaft 11.

Rear transaxle 13 includes a first electric motor M1 for driving rear axles 10. Front transaxle 12 includes a second electric motor M2 for driving front axles 9. Rear transaxle 13 also includes a main (first) transmission 14 and a sub (second) transmission 15 for driving rear axles 10. Main transmission 14 receives power outputted from power unit 5. Sub transmission 15 is disposed on the downstream side of main transmission 14 so as to transmit power outputted from main transmission 14 to right and left rear axles 10. Rear transaxle 13 further includes a PTO transmission 16 that also receives the power outputted from power unit 5 and that transmits the power to PTO shaft 11.

Figure 2:
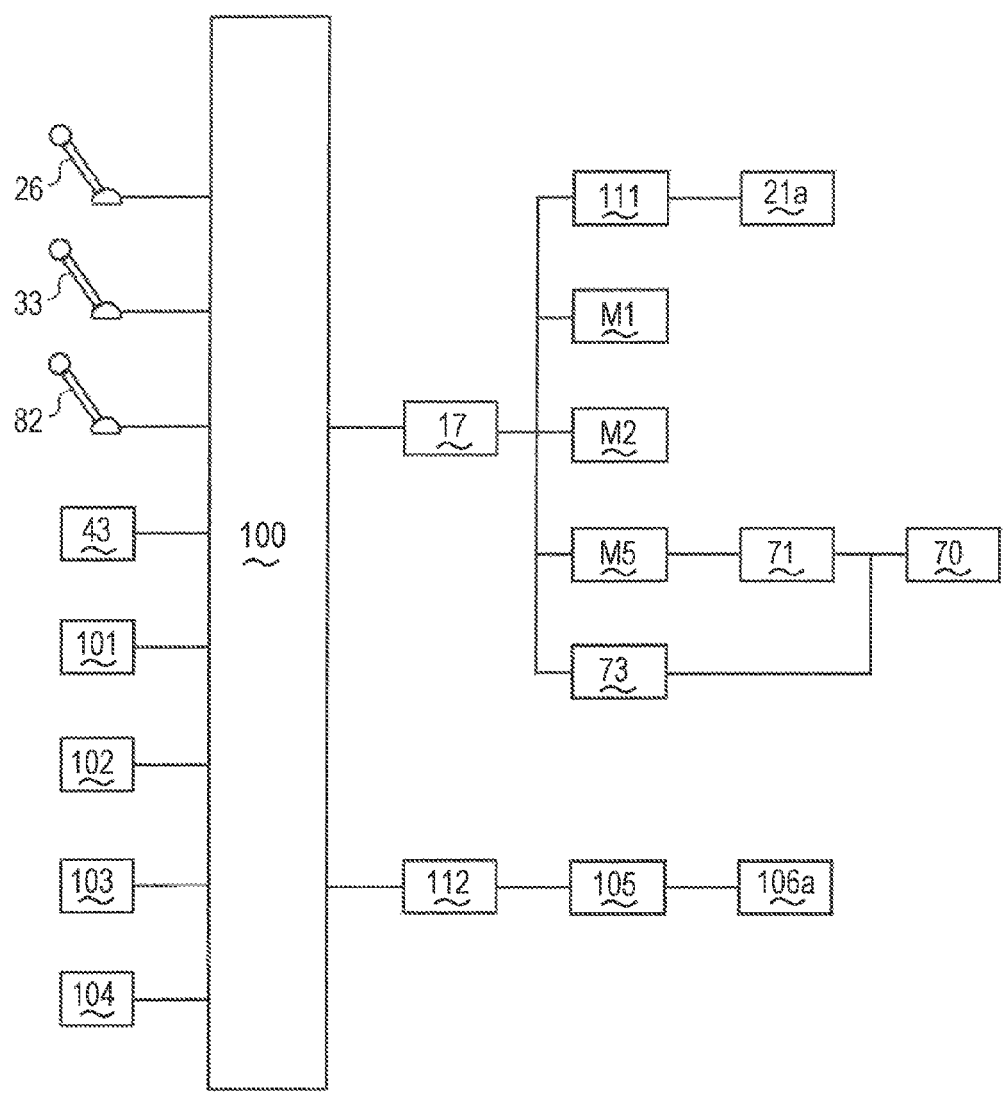
FIG. 2 is a block diagram of a drive control system for traveling and working of vehicle 1.

Referring to FIGS. 1 and 2, power unit 5 will be described in detail. Motor generator 4 in power unit 5 is driven by electric power supplied from a later-discussed battery 18 so as to function as an electric motor for outputting an electric motor power in place of the output power of engine 3 or to assist the output power of engine 3. Motor generator 4 also is driven by the output power of engine 3 so as to function as a generator for charging battery 18.

Power unit 5 includes an output shaft 19 for outputting an output power of power unit 5, which is only the power of engine 3, only the electric motor power of motor generator 4, or a combined power of engine 3 and motor generator 4. Since the electric motor power of motor generator 4 and the output power of engine 3 can be combined as the output power of power unit 5, the electric motor power of motor generator 4 has an effective torque assist function to compensate for lack of torque of engine 3 caused by increase of load on engine 3.

A hybrid inverter 17 includes a boosting converter 17a and an inverter 17b. Hybrid inverter 17 is electrically connected to motor generator 4, battery 18 and a controller 100. In this regard, as shown in FIG. 2, an engine load sensor 43 for detecting load on engine 3 is electrically connected to controller 100. Increase of load on engine 3 depends on driving conditions of wheels 6 and 7 or working implement 8. When engine load sensor 43 detects a value of engine load that is not less than a threshold, i.e., when engine 3 is going to be overloaded, controller 100 transmits a motor driving command signal to hybrid inverter 17 so that direct current electric power stored in battery 18 is boosted by boosting converter 17a and is transformed into alternate current electric power by inverter 17b. This alternate current electric power is supplied to motor generator 4 so as to drive motor generator 4 functioning as the electric motor.

When motor generator 4 functions as the electric motor, motor generator 4 serves as a continuously variable transmission whose output rotary speed is steplessly controlled. The stepless speed control of output power of motor generator 4 effects to parts disposed on the downstream side of motor generator 4 while these downstream parts include gear type sub transmission 15 and gear type PTO transmission 16.

On the contrary, when the load on engine 3 is small (less than a threshold), a sufficient torque of output power of engine 3 causes motor generator 4 to function as a generator that generates alternate current electric power. Inverter 17b in hybrid inverter 17 transforms the alternate current electric power to direct current electric power. This direct current electric power is boosted by boosting converter 17a and is stored in battery 18. In this way, motor generator 4 functions for charging battery 18.

Motor generator 4 transforms potential energy generated at various parts in power unit 5 as well as kinetic energy caused by the output power of engine 3 into electric energy to be stored in battery 18. Therefore, the energy range used for battery charging is expanded so as to reduce average necessary power of engine 3, thereby enabling a smaller size of engine 3.

Referring to FIGS. 1 and 2, an interior construction of rear transaxle 13 will be described. In rear transaxle 13 is configured a power transmission system for the output power of power unit 5 to right and left rear wheels (main drive wheels) 7 and PTO shaft 11. In this regard, output shaft 19 of power unit 5 is drivingly connected to an input shaft (pump shaft) 24 of main transmission 14 via a main clutch 20. A drive train for transmitting the rotary power of input shaft 24 to right and left rear wheels 7 is a traveling drive train 52 including main transmission 14 and sub transmission 15. On the other hand, a branching drive gear 39 is fixed on input shaft 24 so as to branch out the rotary power of input shaft 24 and to transmit the branched power to PTO shaft 11. A drive train for transmitting the rotary power of input shaft 24 to PTO shaft 11 is a PTO drive train 53 including PTO transmission 16. In this way, input shaft 24 and branching drive gear 39 serve as a bifurcating point where the power transmission system is bifurcated into traveling drive train 52 and PTO drive train 53.

Traveling drive train 52 will be described. Main transmission 14 is a hydrostatic stepless transmission (HST) configured as a closed circuit including a variable displacement hydraulic pump 21, a fixed displacement hydraulic motor 22 and a pair of fluid passages 23a and 23b fluidly connecting hydraulic pump 21 to hydraulic motor 22. Hydraulic pump 21 is rotated together with pump shaft 24 drivingly connected to output shaft 19 via main clutch 20. Hydraulic pump 21 has a movable swash plate 21a whose tilt angle and direction is adjusted to change the fluid delivery quantity and direction from hydraulic pump 21 to hydraulic motor 22 via fluid passages 23a and 23b, thereby changing the rotary speed and direction of a motor shaft 25 of hydraulic motor 22. Motor shaft 25 serves as an output shaft of main transmission 14. In this way, the output rotary speed of main transmission 14 is steplessly changed according to a tilt control of movable swash plate 21a.

A configuration for the tilt control of movable swash plate 21a will be described. As shown in FIGS. 1 and 2, movable swash plate 21a is operatively connected to an electric actuator (e.g., a solenoid) 111. Electric actuator 111 is electrically connected to hybrid inverter 17. A main speed shift manipulator 26 is electrically connected to controller 100. Main speed shift manipulator 26 is drawn as a lever in FIG. 2, however, main speed shift manipulator 26 may be another member such as a pedal or a dial.

Due to the above configuration, when main speed shift manipulator 26 is manipulated, a manipulator position signal of main speed shift manipulator 26 is transmitted to controller 100, and controller 100 transmits a main speed changing command signal to hybrid inverter 17 according to the detected manipulator position signal. Accordingly, hybrid inverter 17 supplies the electric power stored in battery 18 to electric actuator 111, so that electric actuator 111 is operated to tilt movable swash plate 21a, thereby shifting an output rotary speed or direction of main transmission 14 (i.e., performing a main speed shift).

Electric actuator 111 for the main speed shift of main transmission 14 is small and needs no hydraulic fluid pipe in comparison with a hydraulic actuator. Further, electric actuator 111 does not need an additional electric power source because it is driven by electric power supplied from battery 18 charged by motor generator 4. As a result, main transmission 14 can be compacted and simplified.

Motor shaft 25 serving as the output shaft of main transmission 14 is drivingly connected to an input shaft 27 of sub transmission 15 so as to transmit the output power of main transmission 14 to sub transmission 15.

Sub transmission 15 is a multi-speed (high and low speed) gear transmission including input shaft 27 and an output shaft 32. A low speed drive gear 28 and a high speed drive gear 29 are fixed on input shaft 27. A low speed driven gear 30 and a high speed driven gear 31 are fitted on output shaft 32 so as to be rotatable relative to output shaft 32. Gears 28 and 30 mesh with each other to constitute a low speed gear train. Gears 29 and 31 mesh with each other to constitute a high speed gear train.

A spline hub 106 is fixed or formed on output shaft 32 between low speed driven gear 30 and high speed driven gear 31. A shifter 106a is spline-fitted on spline hub 106 so as to be axially slidable on spline hub 106 and so as to be unrotatable relative to spline hub 106. Due to the axial slide, shifter 106a is shiftable among a neutral position N to mesh with neither gear 30 nor gear 31, a low speed position Lo to mesh with gear 30, and a high speed position Hi to mesh with gear 31. Clutch teeth 30a for meshing with shifter 106a are formed on low speed driven gear 30. Clutch teeth 31a for meshing with shifter 106a are formed on high speed driven gear 31. Spline hub 106, shifter 106a and clutch teeth 30a and 31a constitute a dog clutch type sub transmission clutch 34.

A hydraulic cylinder 105 having a piston rod 105a serves as a hydraulic actuator for shifting shifter 106a. Piston rod 105a serves as a fork shaft operatively connected to shifter 106a via a fork. A fluid chamber in hydraulic cylinder 105 is fluidly connected to an electromagnetic change over valve 112 via a fluid passage. Electromagnetic change over valve 112 is electrically connected to controller 100. A sub speed shift manipulator 33 for shifting shifter 106a is electrically connected to controller 100. Sub speed shift manipulator 33 is drawn as a lever in FIG. 2, however, it may be another member, e.g., a pedal or a dial.

Sub speed shift manipulator 33 is shiftable among a neutral position for shifting shifter 106a to neutral position N, a low speed position for shifting shifter 106a to low speed position Lo and a high speed position for shifting shifter 106a to high speed position Hi. When sub speed shift manipulator 33 is manipulated, a manipulator position signal of sub speed shift manipulator 33 is transmitted to controller 100, and controller 100 transmits a sub speed shift command signal to electromagnetic change over valve 112 according to the detected manipulator position signal. A solenoid of electromagnetic change over valve 112 is excited or unexcited according to the sub speed shift command signal so as to control the fluid supply to hydraulic cylinder 105, thereby telescopically moving piston rod 105a. Accordingly, shifter 106a is shifted to one of neutral position N, low speed position Lo and high speed position Hi so as to correspond to the position of sub speed shift manipulator 33, i.e., a sub speed shift is performed.

Output shaft 32 is drivingly connected (e.g., at a front end portion thereof) to a motor shaft of electric motor M1 for synchronous rotation control of output shaft 32 to input shaft 27 in correspondence to the sub speed shift. Motor M1 is electrically connected to hybrid inverter 17.

Output shaft 32 extends rearward from sub speed changing transmission 15 so as to be fixedly provided thereon with a bevel pinion 35. Bevel pinion 35 meshes with an input gear (bull gear) 36 of a rear differential unit 37. Rear differential unit 37 differentially connects right and left rear axles 10 supporting respective rear wheels 7 to each other.

As mentioned above, traveling drive train 52 includes main transmission 14, sub transmission 15 and rear differential unit 37 so as to transmit the rotary speed of output shaft 19 of power unit 5 to right and left rear wheels 7.

PTO drive train 53 will be described. As mentioned above, in rear transaxle 13, branching drive gear 39 is fixed on input shaft 24 between main clutch 20 and main transmission 14. A PTO clutch input shaft 41 is extended parallel to input shaft 24. A branching driven gear 40 is fixed on PTO clutch input shaft 41 and meshes with branching drive gear 39.

A PTO clutch output shaft 41a is extended coaxially to PTO clutch input shaft 41, and a PTO clutch 42 is interposed between shafts 41 and 41a. A low speed drive gear 44 and a high speed drive gear 45 are fixed on PTO clutch output shaft 41a. PTO shaft 11 is extended parallel to PTO clutch output shaft 41a. In rear transaxle 13, a low speed driven gear 46 and a high speed driven gear 47 are fitted on PTO shaft 11 so as to be rotatable relative to PTO shaft 11. Gears 44 and 46 mesh with each other to constitute a low speed gear train of PTO transmission 16. Gears 45 and 47 mesh with each other to constitute a high speed gear train of PTO transmission 16.

A spline hub 49 is spline-fitted with a shifter 49a thereon and is fixed on PTO shaft 11. Gears 46 and 47 are formed with respective clutch teeth 46a and 47a for meshing with shifter 49a. Spline hub 49, shifter 49a and clutch teeth 46a and 47a constitute a PTO transmission clutch 51 in PTO transmission 16.

Shifter 49a of PTO transmission clutch 51 is slid by a hydraulic cylinder (hydraulic actuator) 48 controlled by an electromagnetic change over valve 50 so as to be shifted to one of a low speed position Lo to mesh with clutch teeth 46a of gear 46, a high speed position Hi to mesh with clutch teeth 47a of gear 47 and a neutral position N to mesh with neither clutch teeth 46a nor clutch teeth 47a.

As mentioned above, PTO drive train 53 includes a gear train of gears 39 and 40, PTO clutch 42 and PTO transmission 16 so as to transmit the rotary power of output shaft 19 of power unit 5 to PTO shaft 11.

When high load is applied on engine 3 because vehicle 1 starts traveling or accelerates or because working implement 8 is driven, a combined output power of engine 3 and motor generator 4 is transmitted to traveling drive train 52 and PTO drive train 53. At this time, motor generator 4 sufficiently exerts its function for assisting a torque of engine 3. During high speed travel of vehicle 1, only the output power of engine 3 is transmitted to drive trains 52 and 53 while motor generator 4 is driven by engine 3 to function as the generator for charging battery 18. During low speed travel of vehicle 1, engine 3 does not output power to drive trains 52 and 53 while motor generator 4 functions as the electric motor to output power to drive trains 52 and 53.

Here, as mentioned above, the output rotary speed of motor generator 4 disposed at the most upstream side of the power transmission system is steplessly shifted when it functions as the electric motor. Therefore, on an assumption that a set speed stage of sub transmission 15 on traveling drive train 52 and a set speed stage of PTO transmission 16 are kept, the stepless speed shift performance is ensured in driving rear wheels 7 and in driving PTO shaft 11 when the combined output power of engine 3 and motor generator 4 is transmitted to drive trains 52 and 53 or when only the output power of motor generator 4 is transmitted to drive trains 52 and 53. Further, on the same assumption, the stepless speed shift performance is ensured in driving rear wheels 7 when only the output power of engine 3 is transmitted to drive trains 52 and 53 because main transmission 14 on traveling drive train 52 is the FIST, i.e., the continuously variable transmission. As a result, the stepless speed shift performance is constantly ensured in driving rear wheels 7 regardless of however the output powers of engine 3 and motor generator 4 may be transmitted to traveling drive train 52.

Referring to FIGS. 1 and 2, front transaxle 12 will be described in detail. Electric motor M2 in front transaxle 12 is electrically connected to hybrid inverter 17. Motor M2 has a motor shaft drivingly connected to a front wheel clutch input shaft 54. A front wheel clutch output shaft 54a is extended coaxially to front wheel clutch input shaft 54. A front wheel (auxiliary) clutch 55 is interposed between shafts 54 and 54a. A bevel pinion 56 is fixed on a front end of front wheel clutch output shaft 54a. A front differential unit 38 is disposed in front transaxle 12. Bevel pinion 56 meshes with an input gear (bull gear) 57 of front differential unit 38. Front differential unit 38 differentially connects right and left axles 9 supporting respective front wheels 6.

Front wheel clutch 55 is provided to prevent motor M2 from rotating following the inertial rotation of front wheels 6 when the electric power supply to motor M2 is stopped to change the drive mode of vehicle 1 from the four-wheel drive mode to the two-wheel drive mode. Therefore, the desired function of front wheel clutch 55 is that clutch 55 is naturally disengaged by differential rotation of front wheel clutch input and output shafts 54 and 54a caused by stopping the electric power supply to motor M2.

From this viewpoint, front wheel clutch 55 is a one-way clutch that is operable when vehicle 1 travels forward, for example. Alternatively, a one-way clutch for forward traveling and another one-way clutch for backward traveling may be combined to serve as front wheel clutch 55. Alternatively, front wheel clutch 55 may be a bi-directional clutch that can be operated regardless of whether vehicle 1 travels forward or backward.

When motor M2 is supplied with electric power from battery 18 via hybrid inverter 17, motor M2 drives right and left front wheels 6 via front wheel clutch 55 so as to change the two-wheel drive mode to the four-wheel drive mode, thereby improving performance of vehicle 1 in starting, accelerating and driving across steps or rough fields.

When the electric power supply from battery 18 to motor M2 via hybrid inverter 17 is stopped, the drive mode of vehicle 1 is shifted to the two-wheel drive mode to drive only rear wheels 7. At this time, front wheel clutch output shaft 54a drivingly connected to front wheels 6 rotates ahead of front wheel clutch input shaft 54 so as to disengage front wheel clutch 55, e.g., the one-way clutch or the bi-directional clutch, thereby isolating motor M2 from the inertial rotation of front wheels 6, i.e., preventing motor M2 from rotating following front wheels 6.

Figure 3:
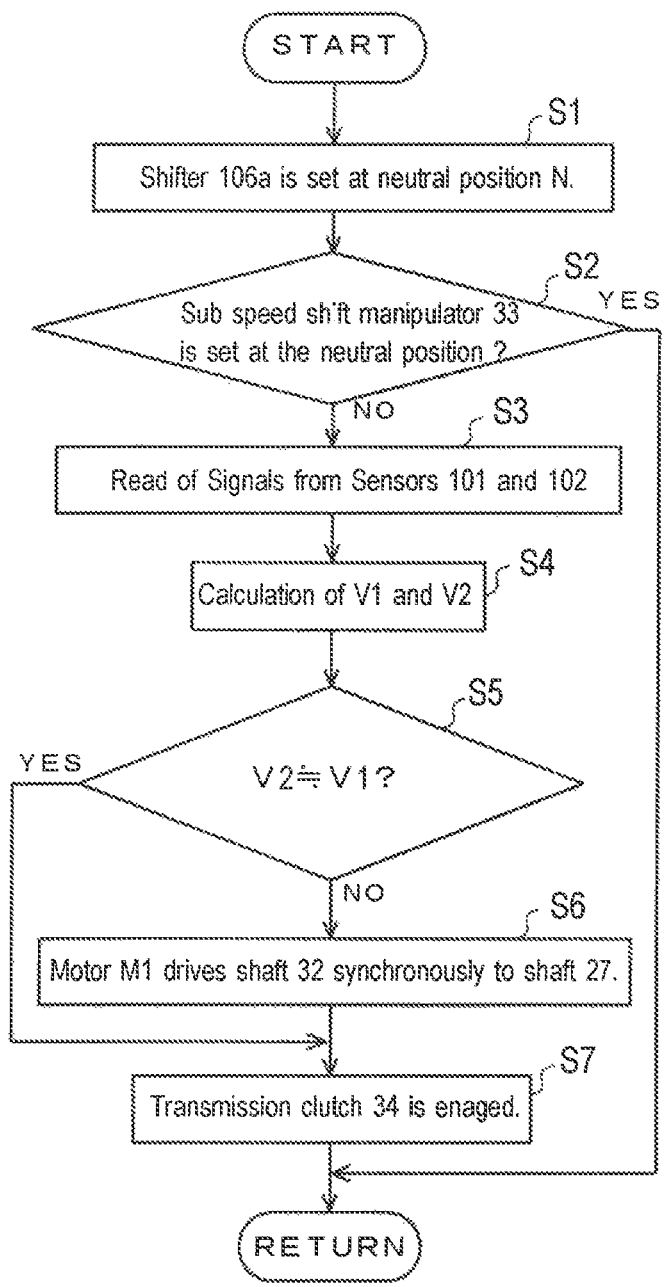
FIG. 3 is a flowchart for a synchronous control by use of a first electric motor M1 for engagement of a transmission clutch 34 in vehicle 1.

Referring to FIGS. 1 to 3, description will now be given of control of electric motor M1 for exerting synchromesh function during gearshift of sub transmission 15 in rear transaxle 13 of vehicle 1. In this regard, sub transmission 15 includes a sensor 101 for detecting a rotary speed of input shaft 27 and a sensor 102 for detecting a rotary speed of output shaft 32. Sensors 101 and 102 are electrically connected to controller 100. Sensors 101 and 102 serve as a differential speed detection means for detecting a differential speed between gear 30 or 31 serving as an upstream side drive member of sub transmission clutch 34 and output shaft 32 serving as a downstream side drive member of sub transmission clutch 34.

A flowchart of FIG. 3 for controlling sub transmission clutch 34 and motor M1 will be described. In the condition that shifter 106a is set at neutral position N (step S1), the position of sub speed shift manipulator 33 is detected (step S2). While the detected position of sub speed shift manipulator 33 is the neutral position (step 2: YES), shifter 106a is held at neutral position N. When the detected position of sub speed shift manipulator 33 is the low speed position or the high speed position (step 2: NO), controller 100 reads an input shaft rotary speed signal issued from sensor 101 and an output shaft rotary speed signal issued from sensor 102 (step S3), thereby calculating a rotary speed of input shaft 27 and a rotary speed V2 of output shaft 32 (step S4). Incidentally, controller 100 previously stores data about a gear ratio of gears 28 and 30 (i.e., the low speed gear train) and a gear ratio of gears 29 and 31 (i.e., the high speed gear train).

Subsequently, if the detected position of sub speed shift manipulator 33 is the low speed position, controller 100 calculates a rotary speed of gear 30 as a rotary speed V1 of the upstream side drive member of sub transmission clutch 34 based on the stored gear ratio of gears 28 and 30 and the calculated rotary speed of input shaft 27 (step S4). If the detected position of sub speed shift manipulator 33 is the high speed position, controller 100 calculates a rotary speed of gear 31 as rotary speed V1 of the upstream side drive member of sub transmission clutch 34 based on the stored gear ratio of gears 29 and 31 and the calculated rotary speed of input shaft 27 (step S4). In this way, controller 100 calculates rotary speed V1 of gear 30 or 31 and rotary speed V2 of output shaft 32 serving as the downstream side drive member of sub transmission clutch 34 (step S4), and controller 100 compares calculated rotary speed V1 with calculated rotary speed V2 so as to judge whether or not rotary speeds V1 and V2 are substantially equal to each other, i.e., whether or not a difference between rotary speeds V1 and V2 is substantially zero (step S5).

In this regard, the word "substantially" is used to define a range of differential speed between V1 and V2 for allowing engagement of sub transmission clutch 34. In other words, if the differential speed between rotary speeds V1 and V2 is very small so as to exist within this range, sub transmission clutch 34 is allowed to be engaged. If the differential speed is so large as to exist out of this range, sub transmission clutch 34 is not allowed to be engaged.

When rotary speeds V1 and V2 are substantially equal (step 5: YES), controller 100 transmits the sub speed shift command signal to electromagnetic change over valve 112, whereby hydraulic cylinder 105 is operated to engage sub transmission clutch 34 (step S7).

When rotary speeds V1 and V2 are not substantially equal to each other (step S5: NO), controller 100 transmits a synchronous drive command signal to hybrid inverter 17 so that hybrid inverter 17 supplies electric power from battery 18 to motor M1 so as to increase or decrease rotary speed V2 of output shaft 32 by driving motor M1 (step S6). Afterward, rotary speeds V1 and V2 are compared again. Step S6 for increasing or decreasing the rotary speed of output shaft 32 is repeated until rotary speeds V1 and V2 become substantially equal. If rotary speeds V1 and V2 become substantially equal, step S7 is exerted to engage sub transmission clutch 34.

The control of sub transmission clutch 34 and motor M1 according to the flowchart of FIG. 3 is advantageous in ensuring smooth gearshift of sub transmission 15 like a stepless speed shift without sharp speed change. For example, when sub speed shift manipulator 33 is shifted from the low speed position to the high speed position during travel of vehicle 1, shifter 106a automatically returns to neutral position N, i.e., sub transmission clutch 34 is disengaged. Afterward, if the rotary speed of output shaft 32 serving as the downstream side drive member drivingly connected to rear wheels 7 is insufficient relative to the rotary speed of gear 31 serving as the upstream side drive member drivingly connected to power unit 5, first electric motor M1 increases the rotary speed of output shaft 32. Once output shaft 32 comes to rotate synchronously to gear 31, shifter 106a is shifted to high speed position Hi, thereby reducing shock when sub transmission clutch 34 is engaged, i.e., shifter 106a meshes with clutch teeth 31a. Similarly, if sub speed shift manipulator 33 is shifted from the high speed position to the low speed position during travel of vehicle 1, motor M1 adjusts the rotary speed of output shaft 32 so as to reduce shock when shifter 106a meshes with clutch teeth 30a.

Figure 4:
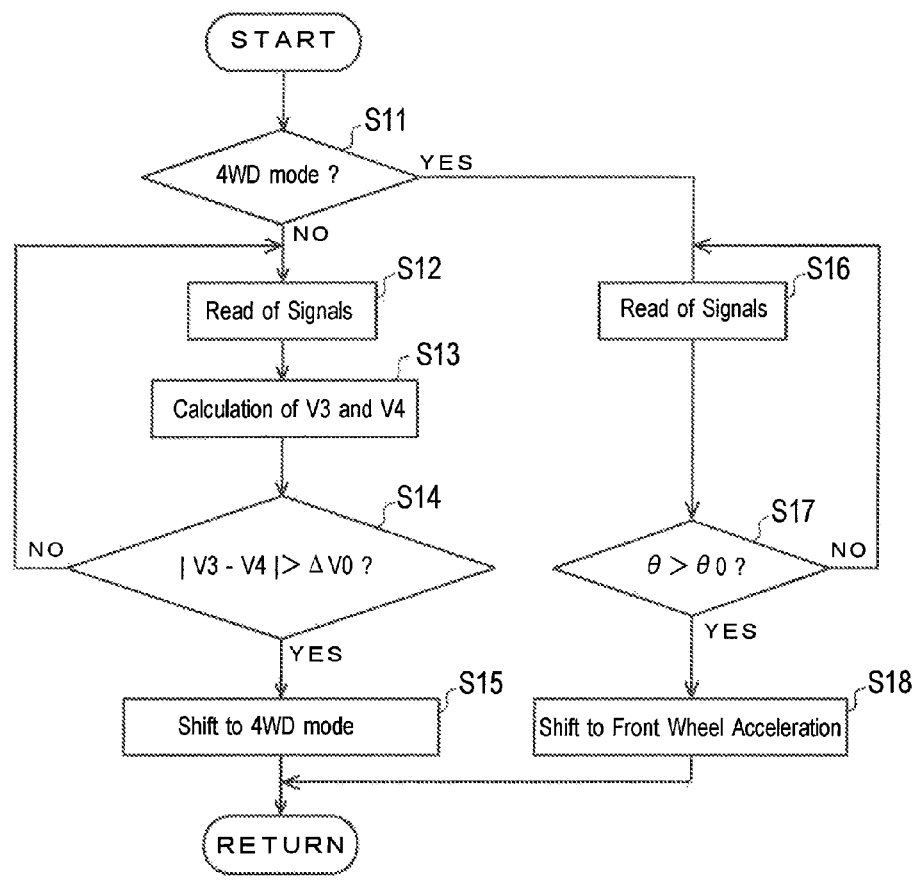
FIG. 4 is a flowchart for controlling a drive mode of vehicle 1 by use of a second electric motor M2 based on detection of slipping of a wheel and for acceleration control of front wheels during turning of vehicle 1.

Referring to FIGS. 1, 2 and 4, a drive control of front transaxle 12 by use of electric motor M2 will be described. As shown in FIG. 1, front transaxle 12 includes a rotary speed sensor 103 for detecting a rotary speed of front wheel clutch output shaft 54a. Front wheels 6 are steerable wheels. Vehicle 1 is equipped with a steering manipulator 58 for turning steerable wheels 6. A rotary angle sensor 104 for detecting a rotary angle of a shaft 59 of steering manipulator 58 is disposed adjacent to shaft 59 so as to serve as a turn angle detection means for detecting a turn angle of vehicle 1 (front wheels 6). As shown in FIG. 2, sensors 103 and 104 are electrically connected to controller 100.

A flowchart of FIG. 4 for controlling motor M2 includes a routine for drive mode selection of vehicle 1 (steps S11 to S15) and a routine for front wheel acceleration during turning of vehicle 1 (steps S11, S16 to S18). The routine for drive mode selection in the flowchart of FIG. 4 will be described. First, controller 100 judges whether or not vehicle 1 travels in the four-wheel drive (4WD) mode (step S11). For example, this judgment is defined as judging whether or not controller 100 transmits a motor driving command signal (i.e., a command signal for driving second electric motor M2) to hybrid inverter 17, i.e., judging whether or not second electric motor M2 is supplied with electric power from battery 18.

When vehicle 1 is judged to be not in the four-wheel drive mode (step S11: NO), when vehicle 1 travels in the two-wheel drive (2WD) mode, controller 100 reads the rotary speed signal issued from sensor 102 and the rotary angle signal issued from sensor 103 (step S12). Incidentally, controller 100 previously stores data about diameters of front and rear wheels 6 and 7.

Controller 100 calculates a rotary speed of front wheel clutch output shaft 54a based on the read rotary speed signal from sensor 102, and calculates a peripheral speed V3 of front wheels 6 based on the calculated rotary speed of shaft 54a and the stored diameter of front wheel 6 (step S13). Controller 100 also calculates rotary speed V2 of output shaft 32 based on the rotary speed signal issued from sensor 102 as mentioned above, and calculates a peripheral speed V4 of rear wheels 7 based on the calculated rotary speed V2 of shaft 32 and the stored diameter of rear wheel 7 (step S13). Then, controller 100 judges Whether or not an absolute value of difference between calculated peripheral speeds V3 and V4 exceeds a threshold $\Delta V0$ (step S14).

When the absolute value of difference between peripheral speeds V3 and V4 exceeds threshold $\Delta V0$ (step S14: YES), controller 100 transmits the motor driving command signal to hybrid inverter 17, so that hybrid inverter 17 supplies electric power from battery 18 to motor M2 according to the motor driving command signal, whereby motor M2 is driven to transmit its output power to front wheels 7 so as to shift the drive mode of vehicle 1 into the four-wheel drive mode (step S15). On the contrary, while the absolute value of difference between peripheral speeds V3 and V4 is not more than threshold $\Delta V0$ (step S14: NO), electric power is not supplied to motor M2, thereby keeping vehicle V1 in the two-wheel drive mode.

As mentioned above, controller 100 controls the driving on-and-off of motor M2 based on the difference between the peripheral speed of front wheels 6 and the peripheral speed of rear wheels 7 so as to select either the four-wheel drive mode or the two-wheel drive mode as the drive mode of vehicle 1. This control of motor M2 for selection of the drive mode of vehicle 1 expressed as steps S11 to S14 of the flowchart of FIG. 4 is used as a control of the drive mode corresponding to whether or not either front wheel 6 or rear wheel 7 slips. More specifically, during travel of vehicle 1 in the two-wheel drive mode, when either front wheel 6 or rear wheel 7 slips, a large difference occurs between the peripheral speed of front wheels 6 and the peripheral speed of rear wheels 7, i.e., the differential peripheral speed exceeds threshold $\Delta V0$. At this time, hybrid inverter 17 automatically supplies electric power from battery 18 to motor M2 so as to dive motor M2 for driving front wheels 6, thereby shifting the drive mode of vehicle 1 into the four-wheel drive mode, whereby vehicle 1 quickly escapes from the slipping condition.

The routine for front wheel acceleration during turning of vehicle 1 in the flowchart of FIG. 4 will be described. When vehicle 1 is judged to travel in the four-wheel drive mode (step S11: YES), controller 100 reads the rotary angle signal issued from sensor 104 (step S16), and calculates a turn angle $\Theta$ of vehicle 1 based on the read rotary angle signal.

Then, controller 100 judges whether or not calculated turn angle $\Theta$ of vehicle 1 exceeds a threshold $\Theta 0$ (step S17). When turn angle $\Theta$ exceeds threshold $\Theta 0$ (step S17: YES), controller 100 transmits a front wheel acceleration command signal to hybrid inverter 17, so that hybrid inverter 17 increases the electric power supplied from battery 18 to motor M2 according to this command signal so as to increase the output rotary speed of motor M2, thereby accelerating front wheels 6 (step S18). When turn angle $\Theta$ is not more than threshold $\Theta 0$ (step S17: NO), front wheels 6 are not accelerated, i.e., the rotary speed of front wheels 6 is kept substantially equal to the rotary speed of rear wheels 7.

In the case where vehicle 1 is configured so that turning of vehicle 1 causes a difference between a turn radius of front wheels 6 and a turn radius of rear wheels 7, e.g., in the case where vehicle 1 is an Ackerman steering type vehicle, the acceleration of front wheels 6 is advantageous in preventing front wheels 6 or rear wheels 7 from dragging or slipping caused by their different turn radiuses during turning of vehicle 1. Therefore, if vehicle 1 is configured so that turning of vehicle 1 causes no difference between the turn radius of front wheels 6 and the turn radius of rear wheels 7, the routine for front wheel acceleration may be canceled.

Figure 5:
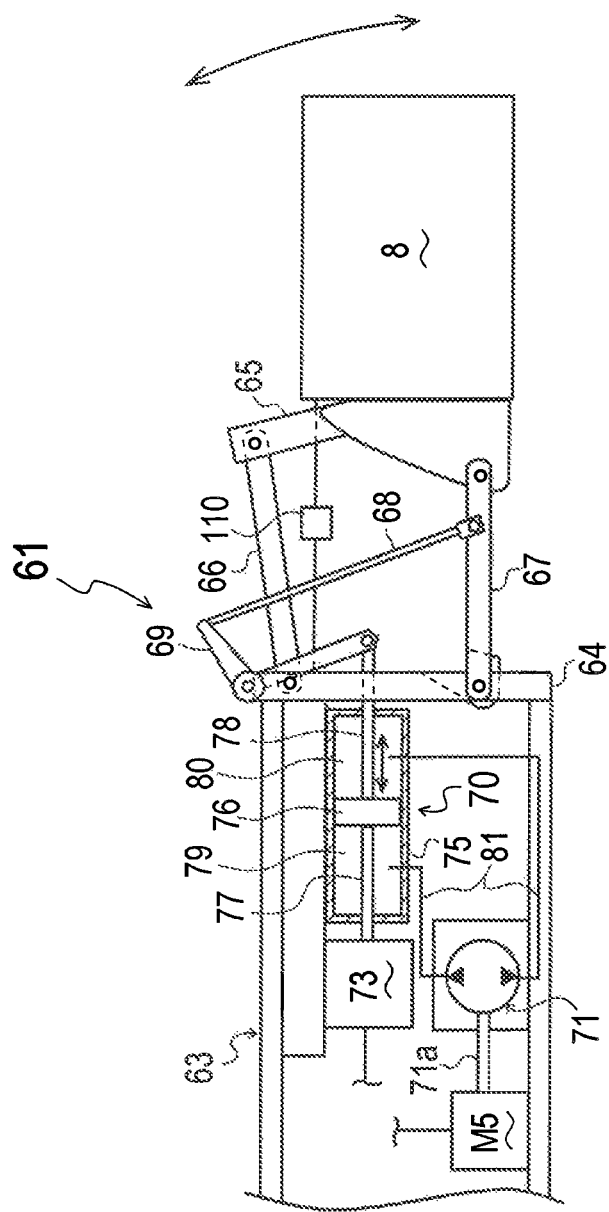
FIG. 5 is a schematic side view of a lifting linkage 61 provided on the vehicle 1.

Referring to FIG. 5, a lifting linkage 61 for lifting working implement 8 and a driving system for lifting linkage 61 will be described. Lifting linkage 61 is a three-point linkage including a top link 66 and right and left lower links 67. Lifting linkage 61 includes a hitch frame 64 and a hitch 65. Hitch frame 64 and hitch 65 are pivotally connected to each other via top link 66 and right and left lower links 67. Hitch frame 64 is fixed on a rear end of a vehicle body frame 63 of vehicle 1. When working implement 8 is connected to lifting linkage 61, a front portion of working implement 8 is engaged to hitch 65.

Lifting linkage 61 further includes a lift arm 69 and right and left lift rods 68. Lift arm 69 is pivoted on vehicle body frame 63 so as to be rotatable in the fore-and-aft direction of vehicle 1. Right and left lift rods 68 are extended from lift arm 69 to respective lower links 67 so as to pivotally connect right and left lower links 67 to lift arm 69. A hydraulic cylinder 70 is supported by vehicle body frame 63 so as to serve as an actuator for lifting linkage 61. A piston rod 78 is extended rearward from a piston 76 in hydraulic cylinder 70, and is pivotally connected at a rear end thereof to lift arm 69. A telescopic movement of piston rod 78 rotates lift arm 69 so that top link 66 and lower links 67 vertically rotate centered on respective pivots thereof on hitch frame 64 so as to move hitch 65 upward or downward, thereby raising or lowering working implement 8.

Hydraulic cylinder 70 is a double-action cylinder whose inner space is divided into a front fluid chamber 79 and a rear fluid chamber 80 by piston 76. Foresaid piston rod 78 is extended rearward through rear fluid chamber 80. Further, a piston rod 77 is extended forward from piston 76 through front fluid chamber 79 and is operatively connected at a front end thereof to a later-discussed generator 73.

Generator 73, an electric motor M5 and a hydraulic pump 71 are provided on vehicle body frame 63. Generator 73 and motor M5 are electrically connected to hybrid inverter 17 as shown in FIG. 2. Hydraulic pump 71 has a pump shaft 71a drivingly connected to an output shaft of motor M5. Generator 73 is operatively connected to the front end of piston rod 77 as mentioned above. Hydraulic pump 71 is fluidly connected to front and rear fluid chambers 79 and 80 via respective fluid passages 81. A lifting manipulator 82 for raising and lowering working implement 8 is provided on vehicle 1, and is electrically connected to controller 100 as shown in FIG. 2. In FIG. 2, lifting manipulator 82 is drawn as a lever, however, it may be another member, e.g., a switch.

When lifting manipulator 82 is manipulated for raising working implement 8, a position signal of lifting manipulator 82 manipulated for the raising is inputted to controller 100. Controller 100 transmits a raising command signal to hybrid inverter 17 according to the inputted position signal. According to the raising command signal, hybrid inverter 17 supplies electric power from battery 18 to motor M5 so as to drive motor M5 for driving hydraulic pump 71. Hydraulic pump 71 driven according to the raising command signal delivers fluid so as to supply fluid to front fluid chamber 79 and so as to release fluid from rear fluid chamber 80. Accordingly, piston 76 and piston rod 78 move rearward to rotate lift arm 68 forward, thereby raising working implement 8 engaged to hitch 65.

When lifting manipulator 82 is manipulated for lowering working implement 8, a position signal of lifting manipulator manipulated for the lowering is inputted to controller 100. Controller 100 transmits a lowering command signal to hybrid inverter 17 according to the inputted position signal. According to the lowering command signal, hybrid inverter 17 supplies electric power from battery 18 to motor M5 so as to drive motor M5 for driving hydraulic pump 71. Hydraulic pump 71 driven according to the lowering command signal delivers fluid so as to supply fluid to rear fluid chamber 80 and so as to release fluid from front fluid chamber 79. Accordingly, piston 76 and piston rod 78 move forward to rotate lift arm 68 rearward, thereby lowering working implement 8 engaged to hitch 65.

Further, according to the movement of piston 76 for raising or lowering working implement 8, piston rod 77 moves together with piston 76. This movement of piston rod 77 causes generator 73 to generate electric power for charging battery 18 via hybrid inverter 17. In this way, the kinetic energy of piston 76 for raising or lowering working implement 8 is regenerated as electric energy by generator 73 so as to be used for driving motor generator 4 functioning as the electric motor.

Alternatively, hydraulic cylinder 70 may be a single-action cylinder, and hydraulic pump 71 may deliver fluid for only the purpose of rearward moving piston 76 and piston rod 78 to raise working implement 8, so that the lowering of working implement 8 can depend on its natural gravity falling. In this case, when working implement 8 is raised, electric power is supplied to motor M5 to drive hydraulic pump 71, and when working implement 8 is lowered, electric power is not supplied to motor M5 for driving hydraulic pump 71. Generator 73 can generate electric power by the fore-and-aft movement of piston rod 77 regardless of whether or not electric power is supplied to motor M5.

Various alternative working vehicles will be described with reference to FIGS. 6 to 11. The reference numerals used in FIGS. 1, 2 and 5 are adapted to designate members and portions identical to those of vehicle 1 or having the same functions as those of vehicle 1.

Figure 6:
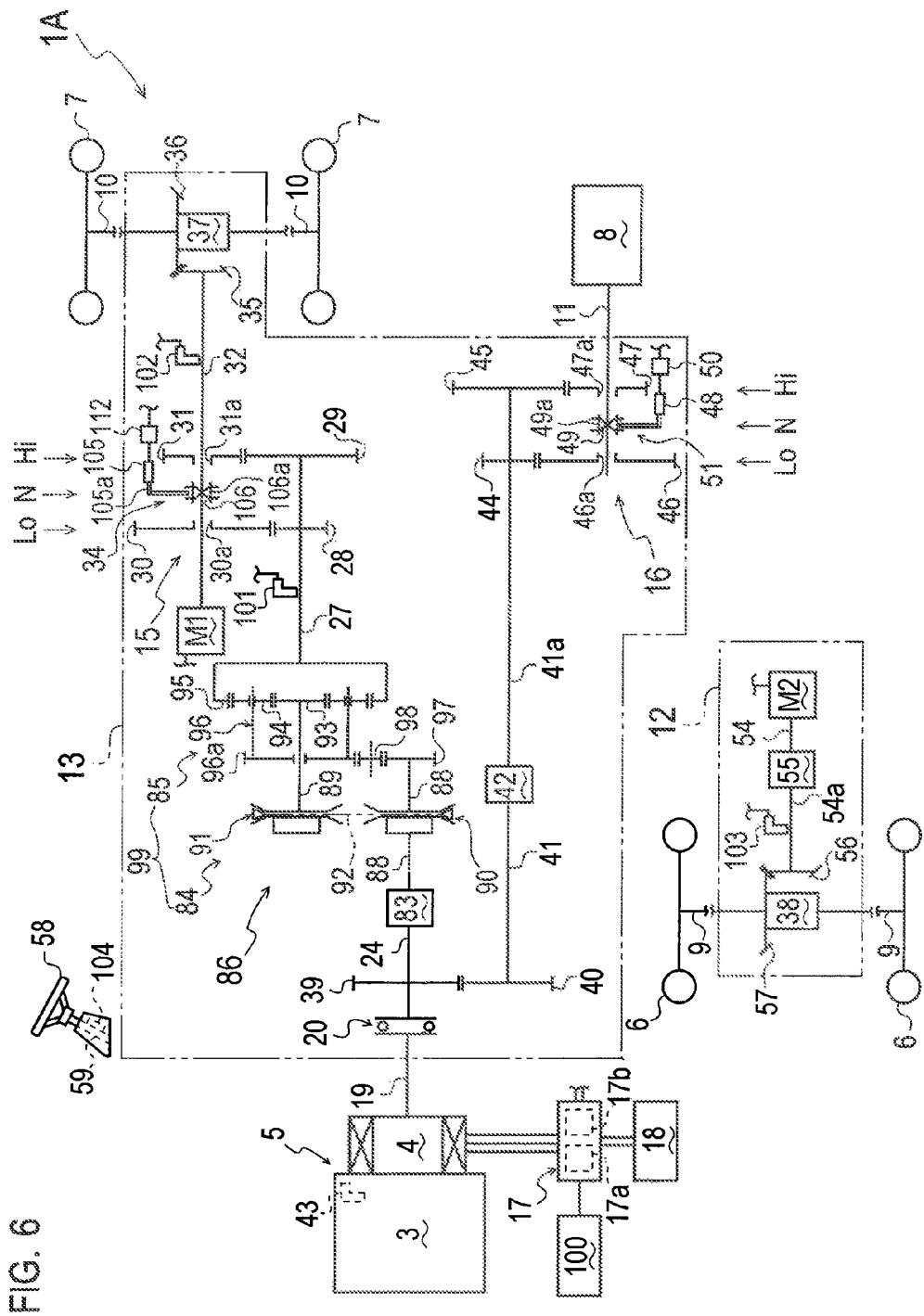
FIG. 6 is a skeleton diagram of an alternative hybrid working vehicle 1A.

Referring to FIG. 6, a hybrid working vehicle 1A corresponds to vehicle 1 except for a main transmission 86 replacing hydraulic main transmission 14. Main transmission 86 includes a forward/backward traveling direction switching device (i.e., a reverser) 83 that may be a gear type reverser or so on, and a continuously variable transmission (hereinafter referred to as "CVT") 99. Continuously variable transmission 99 includes a belt type continuously variable transmission (hereinafter referred to as "belt CVT") 84 and a planetary gear mechanism 85. Main transmission 86 is provided to improve a power transmission performance in comparison with hydraulic main transmission 14.

In rear transaxle 13 of vehicle 1A, input shaft 24 serving as the bifurcating point between traveling drive train 52 and PTO drive train 53 is drivingly connected to output shaft 19 of power unit 5 via main clutch 20, similar to input shaft 24 of vehicle 1. Reverser 83 of main transmission 86 is interposed between input shaft 24 and a drive pulley shaft 88 serving as an input shaft of belt CVT 84. While the rotary direction of input shaft 24 is constant, reverser 83 can select either of opposite rotary directions of drive pulley shaft 88.

Belt CVT 84 includes a variable drive pulley 90, a variable driven pulley 91 and a belt 92 interposed between pulleys 90 and 91. The groove widths of pulleys 90 and 91, i.e., a belt-looping diameter ratio between pulleys 90 and 91 is automatically changed to correspond to change of output rotary speed of power unit 5 or according to manipulation of main speed shift manipulator 26 adapted to vehicle 1A as a manipulator for adjusting the groove widths of pulleys 90 and 91.

Planetary gear mechanism 85 includes a sun gear 93, planetary gears 94 and a ring-shaped internal gear 95. Planetary gears 94 are disposed on an outer peripheral edge of sun gear 93 and mesh with sun gear 93. Planetary gears 94 are supported by a carrier 96. Ring-shaped internal gear 95 meshes with outer peripheral edges of planetary gears 94. Internal gear 95 is fixed on input shaft 27 of sub transmission 15. Sun gear 93 is fixed on a driven pulley shaft 89 extended from driven pulley 91. Drive pulley shaft 89 penetrates carrier 96 so as to be rotatable relative to carrier 96. A gear 96a is formed in a flange-shape on an outer peripheral edge of carrier 96. Drive pulley shaft 88 is further extended from drive pulley 90 opposite to reverser 83 so as to be fixedly provided thereon with a gear 97. Gear 97 meshes with gear 96a via an idle gear 98.

Accordingly, the rotation of sun gear 93 is integral with the rotation of driven pulley shaft 89 as the output rotation of belt CVT 84. On the other hand, gears 97, 98 and 96a transmit the input rotation of belt CVT 84, i.e., the rotation before speed-shift of belt CVT 84, to carrier 96 so that planetary gears 94 revolute centered on sun gear 93 so as to follow the rotation of carrier 96. During this revolution, planetary gears 94 receive the rotation of sun gear 93 so as to rotate centered on their own axes. The revolution and rotation of planetary gears 94 are transmitted to internal gear 93. The resultant rotation of internal gear 95 serves as the Output rotation of main transmission 86 so as to integrally rotate input shaft 27 of sub transmission 15.

Due to the above-mentioned structure, the input/output rotary ratio of belt CVT 84 is adjusted to continuously speed-shift the rotation outputted from main transmission 86 to input shaft 27 of sub transmission 15 among a forward traveling direction, a geared neutral state where the output rotation speed is zero and a backward traveling direction.

In main transmission 86, CVT 99 including belt CVT 84 and planetary gear mechanism 85 ensures a great range of variation in the input/output rotary speed ratio between drive pulley shaft 88 serving as the input shaft of CVT 99 and input shaft 27 of sub transmission 15 serving as the output shaft of CVT 99. Further, reverser 83 is disposed on the upstream side of drive pulley shaft 88 and either of the opposite rotary directions of drive pulley shaft 88 can be selected, so that the effect of the great speed-ratio range of CVT 99 can be evenly obtained regardless of whether reverser 83 is set for forward traveling or for backward traveling.

Figure 7:
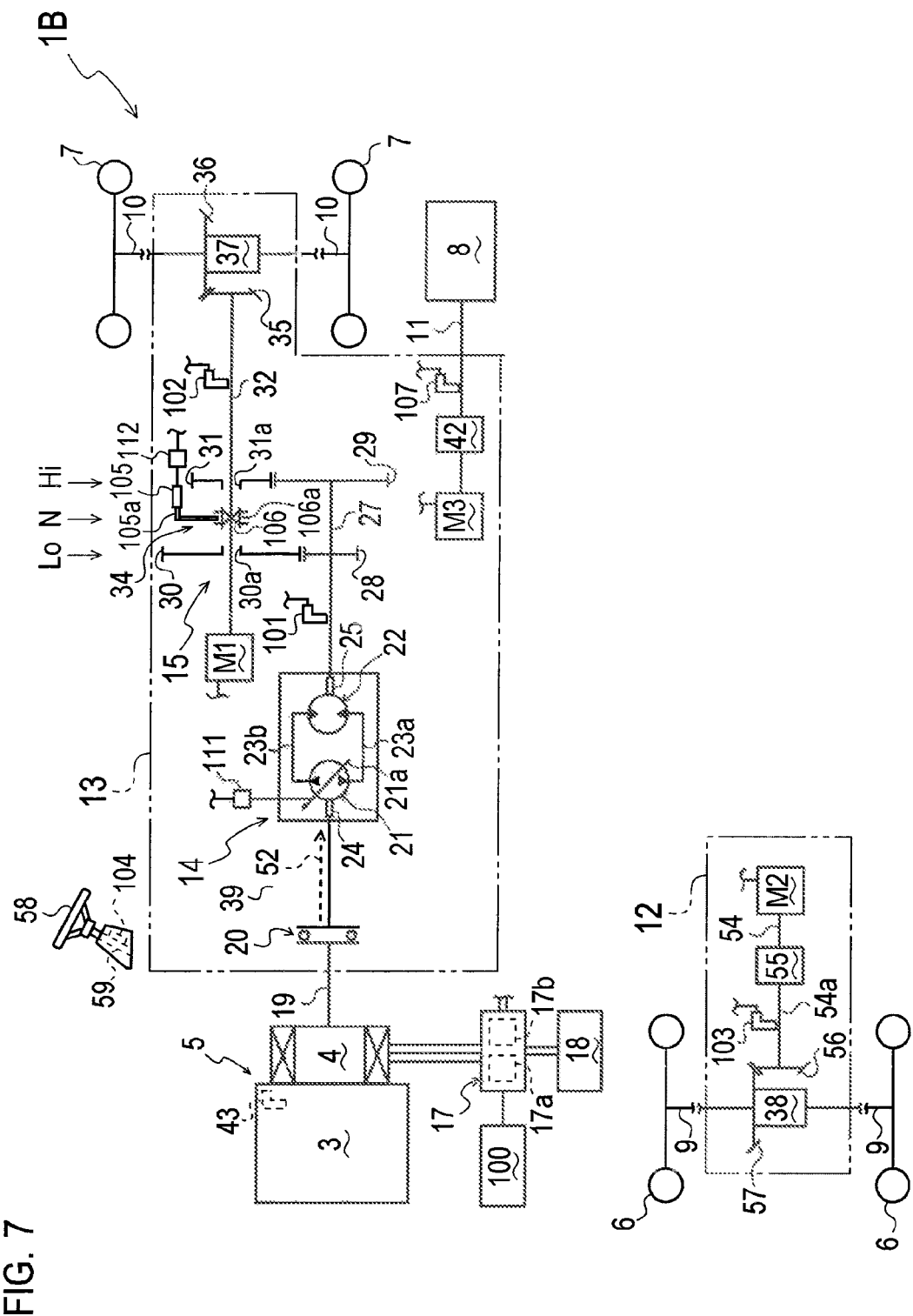
FIG. 7 is a skeleton diagram of an alternative hybrid working vehicle 1B.

Referring to FIG. 7, a hybrid working vehicle 1B will be described. Vehicle 1B is identical to vehicle 1 except that PTO shaft 11 is driven by a third electric motor M3 instead of power unit 5, thereby enhancing variation in PTO output patterns and minimizing rear transaxle 13.

Motor M3 is electrically connected to hybrid inverter 17 and has a motor shaft drivingly connected to PTO shaft 11. PTO clutch 42 is intervened on an intermediate portion of PTO shaft 11. When controller 100 transmits a motor driving command signal to hybrid inverter 17, according to the motor driving command signal, hybrid inverter 17 supplies electric power from battery 18 to motor M3 so as to drive motor M3, thereby transmitting the output power of motor M3 to PTO shaft 11 and working implement 8 drivingly connected to PTO shaft 11.

Incidentally, similar to vehicle 1, vehicle 1B is equipped with a lifting linkage 61 so as to enable regeneration of electric energy from kinetic energy in raising and lowering working implement 8.

Figure 8:
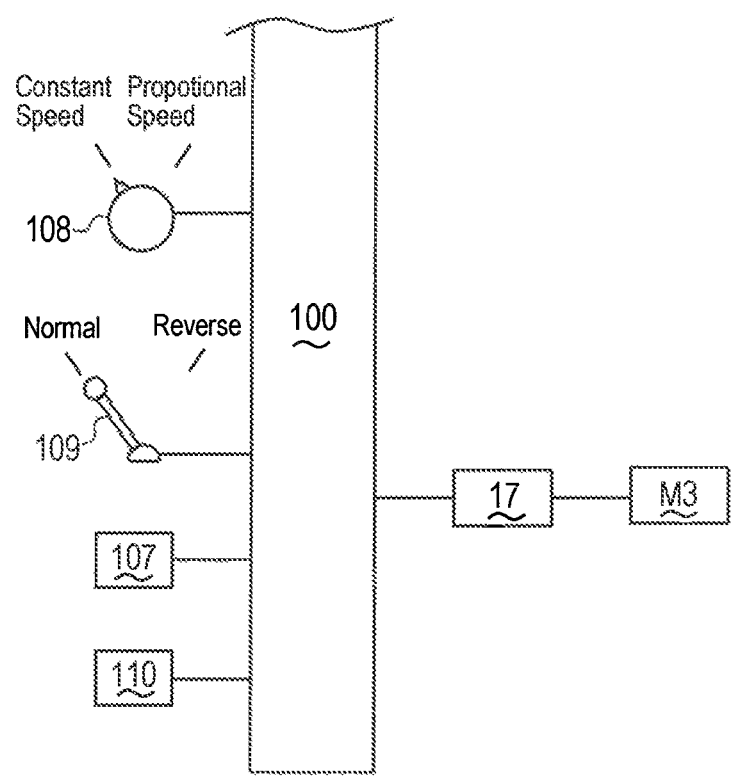
FIG. 8 is a block diagram for controlling the drive of a PTO shaft 11 of vehicle 1B.

Referring to FIG. 8, a PTO speed control system in vehicle 1B will be described. A PTO speed control selection switch 108 and a PTO rotary direction selection lever 109 are electrically connected to controller 100. Switch 108 is shiftable between a constant speed position to keep a constant rotary speed of PTO shaft 11 and a proportional speed position to control the rotary speed of PTO shaft 11 in proportion to traveling speed of vehicle 1B (vehicle speed). Lever 109 is shiftable between a normal rotary position for driving PTO shaft 11 in a normal direction and a reverse rotary position for driving PTO shaft 11 in a reverse direction. Switch 108 or lever 109 may be replaced with another manipulator.

Further, a PTO shaft rotary sensor 107 and a limit switch 110 are electrically connected to controller 100. Sensor 107 detects a rotary speed of PTO shaft 11. Limit switch 110 for detecting movement of raised or lowered working implement 8 is interposed between working implement 8 and a vehicle body side, e.g., hitch frame 64. Aforesaid rotary speed sensors 102 and 103 are also provided in vehicle 1B. In vehicle 1B, sensor 102 detects the rotary speed and direction of shaft 32, and sensor 103 detects the rotary speed and direction of shaft 54a.

Figure 9:
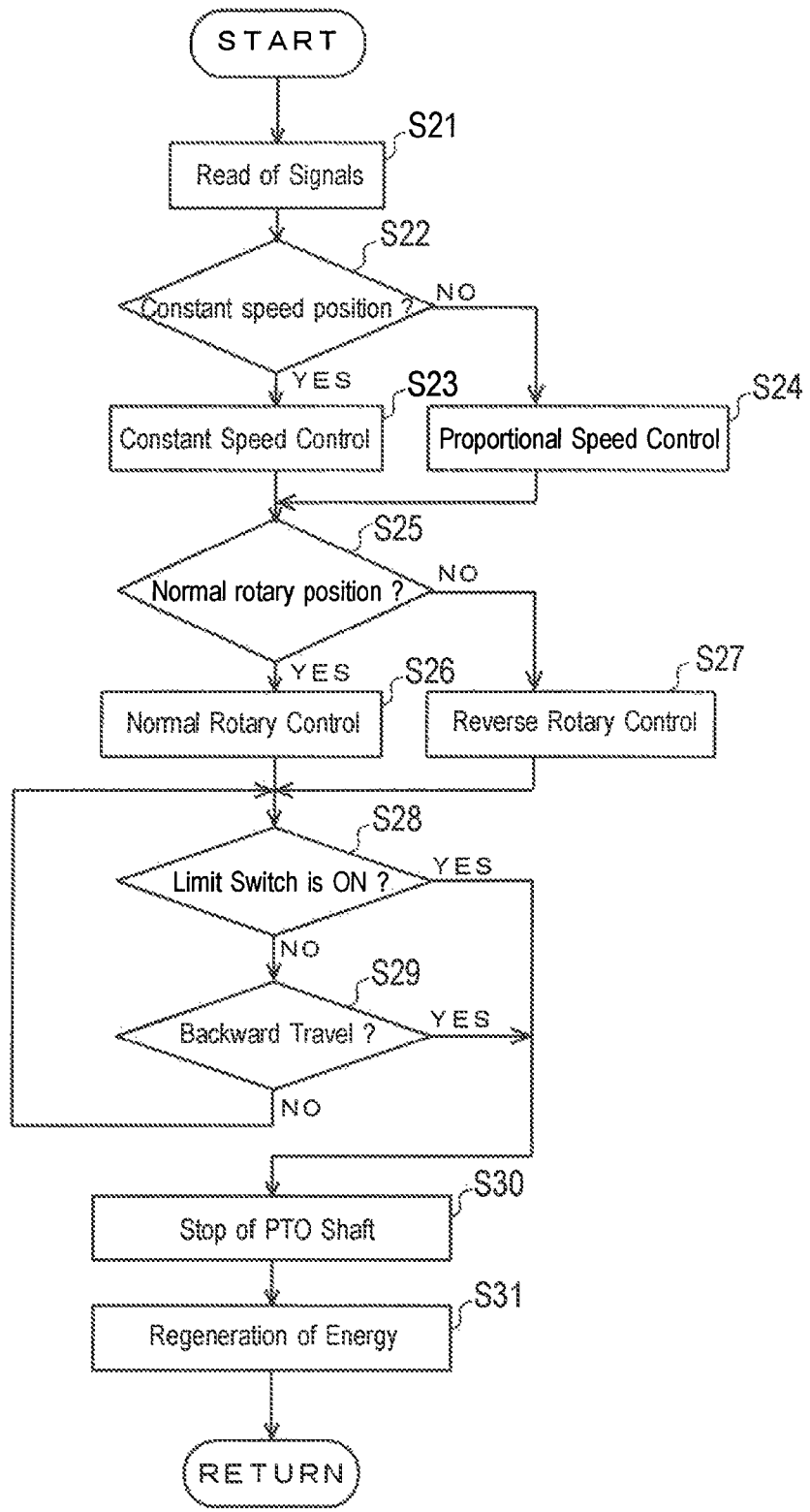
FIG. 9 is a flowchart for controlling the driving of the PTO shaft 11 of vehicle 1B.

Due to such a configuration, as shown in FIG. 9, switch 108, lever 109, sensor 107, limit switch 110 and sensors 102 and 103 issue a switch position signal, a lever position signal, a PTO shaft rotary speed signal, a limit signal and rotary speed and direction signals, respectively. Controller 100 reads these signals (step S21).

According to the switch position signal indicating the position of switch 108, controller 100 judges whether or not switch 108 is set at the constant speed position (step S22). When controller 100 judges that switch 108 is set at the constant speed position (step S22: YES), controller 100 commands hybrid inverter 17 so as to control the output rotary speed of third electric motor M3 to keep the certain constant rotary speed of PTO shaft 11 (step S23). On the contrary, when controller 100 judges that switch 108 is not set at the constant speed position, i.e., that switch 108 is set at the proportional speed position (step S22: NO), controller 100 commands hybrid inverter 17 so as to control the output rotary speed of third electric motor M3 to control the rotary speed of PTO shaft 11 in proportion to the vehicle speed calculated based on the rotary speed signals issued from sensors 102 and 103 (step S24).

Further, according to the lever position signal indicating the position of lever 109, controller 100 judges whether or not lever 109 is set at the normal rotary position (step S25). When controller 100 judges that lever 109 is set at the normal rotary position (step S25: YES), controller 100 commands hybrid inverter 17 so as to control the output rotary direction of motor M3 to rotate PTO shaft 11 in the normal direction (step S26). On the contrary, when controller 100 judges that lever 109 is not set at the normal rotary position, i.e., that lever 109 is set at the reverse rotary position (step S25: NO), controller 100 commands hybrid inverter 17 so as to control the output rotary direction of motor M3 to rotate PTO shaft 11 in the reverse direction (step S27).

According to the limit signal indicating whether limit switch 110 is switched on or off, controller 100 judges whether or not limit switch 110 is switched on (step S28), thereby judging whether or not working implement 8 is raised. Further, according to the rotary speed and direction signals issued from sensors 102 and 103 indicating the rotary speeds and directions of shafts 32 and 54a, controller 100 judges whether or not vehicle 1B travels backward (step S29). When limit switch 110 is switched on because working implement 8 is raised (step S28: YES) or when vehicle 1B travels backward (step S29: YES), controller 100 commands hybrid inverter 17 to stop the electric power supply from battery 18 to motor M3 so as to stop the rotation of PTO shaft 11 (step S30). After the electric power supply to motor M3 is stopped, upward or downward movement of working implement 8 drives generator 73 so as to regenerate electric energy from the kinetic energy (step S31).

As mentioned above, in vehicle 1B, the driving of PTO shaft 11 depends on the output power of third electric motor M3, thereby enabling fine control of the rotary speed and direction of PTO shaft 11 and the condition for stopping PTO shaft 11, and thereby providing various output patterns of PTO. Further, vehicle 1B does not need any drive train for transmitting the rotation of output shaft 19 of power unit 5 to PTO shaft 11 and does not need PTO transmission 16, thereby minimizing rear transaxle 13.

Figure 10:
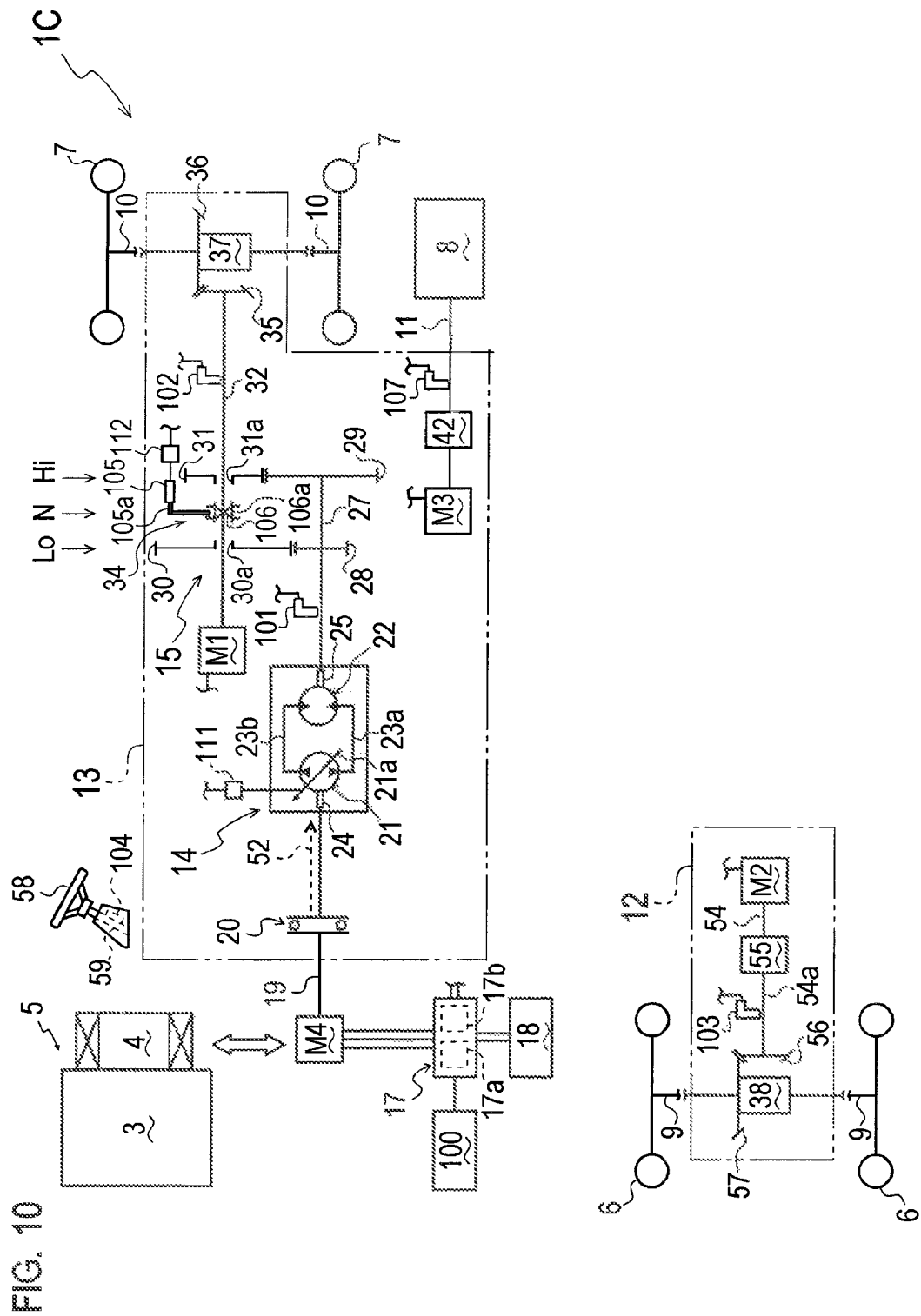
FIG. 10 is a skeleton diagram of an alternative electric working vehicle 1C.

Referring to FIG. 10, an electric working vehicle 1C will be described. Vehicle 1C is identical to vehicle 1B except that a fourth electric motor M4 for driving rear wheels 7 replaces power unit 5 so that front wheels 6, rear wheels 7 and PTO shaft 11 are driven by only electric power. Motor M4 is electrically connected to inverter 17 electrically connected to controller 100 and battery 18. In vehicle 1C, an output shaft of motor M4 serves as output shaft 19 that is drivingly connected to input shaft 24 of main transmission 14 via clutch 20. Controller 100 commands inverter 17 to supply electric power from battery 18 to motor M4, thereby driving rear wheels 7.

In this way, vehicle 1C has independent electric motors M2, M3 and M4 so that motor M2 drives shaft 54 for driving front wheels 6, motor M3 drives PTO shaft 11 for driving working implement 8, and motor M4 drives shaft 32 for driving rear wheels 7. Therefore, vehicle 1C can be provided as a low-emission working vehicle that uses no engine power.

In vehicle 1C, in the case where the output rotation of motor M4 is continuously variable in speed and is reversible in direction, HST 14 may be canceled because motor M4 can function as the continuously variable transmission, thereby further minimizing rear transaxle 13.

Further, as shown in FIG. 10, vehicle 1C may be provided with an attachment structure for easily exchanging motor M4 for power unit 5. In this case, if vehicle 1C needs power of engine 3 for high speed travel or high load work, motor M4 can be easily exchanged for power unit 5, thereby increasing the range of its use.

Referring to FIG. 11, a hybrid working vehicle 1D will be described. Vehicle 1D is a tractor. Working implement 8 is attached to vehicle 1D via lifting linkage 61. Power unit 5 for driving rear wheels 7 is mounted on vehicle 1D, similar to power unit 5 in vehicle 1B. On the other hand, a motor generator 72 for driving working implement 8 is mounted on working implement 8. Therefore, PTO shaft 11 for transmitting power from vehicle 1D to working implement 8 is unnecessary.

In this regard, PTO speed control selection switch 108 and PTO rotary direction selection lever 109 serving as manipulators for controlling the speed and direction of output rotary to be transmitted to working implement 8 are disposed in vehicle 10 for convenience of an operator sitting in vehicle 1D. These manipulators 108 and 109 are electrically connected to controller 100 disposed in vehicle 1D. Motor generator 72 is electrically connected via harness for wirelessly) to controller 100 and hybrid inverter 17 in vehicle 1D. Therefore, no part for power transmission except for the electric wire is interposed between vehicle 1D and working implement 8, thereby enhancing freedom in design.

What is claimed is:

1. A hybrid working vehicle, comprising:
   an engine;
   a drive wheel;
   a power take-off (PTO) shaft;
   a power transmission system for transmitting power from the engine to the drive wheel and the PTO shaft, the power transmission system being bifurcated at a bifurcating point into a traveling drive train for driving the drive wheel and a PTO drive train for driving the PTO shaft;
   a continuously variable transmission provided on the traveling drive train;
   a motor generator provided on the power transmission system between the engine and the bifurcating point,
   wherein the motor generator functions as a generator driven by the engine to charge electric power in a battery or functions as an electric motor supplied with electric power from the battery to drive the power transmission system; and
   a controller for controlling an output rotary speed of the motor generator functioning as the electric motor,
   wherein the engine and the motor generator are assembled as a power unit having an output therefrom to the bifurcating point, and
   wherein the output of the power unit is one selected among an output power of only the engine, an output power of only the motor generator functioning as the electric motor, and a combined output power of the engine and the motor generator functioning as the electric motor.

2. The hybrid working vehicle according to claim 1, further comprising:
   a second transmission provided on the traveling drive train,
   wherein the second transmission includes a transmission clutch interposed between an upstream side drive member drivingly connected to the engine and a downstream side drive member drivingly connected to the drive wheel; and
   a first electric motor drivingly connected to the downstream side drive member and driven by the electric power supply from the battery,
   wherein, when the transmission clutch of the second transmission is engaged to drivingly connect the upstream side drive member to the downstream side drive member, the controller controls an output rotary speed of the first electric motor so as to drive the downstream side drive member synchronously to the upstream side drive member.

3. The hybrid working vehicle according to claim 1, wherein the drive wheel driven by the traveling drive train is defined as a main drive wheel, wherein the hybrid working vehicle further comprises:
   an auxiliary drive wheel; and
   a second electric motor drivingly connected to the auxiliary drive wheel and driven by the electric power supply from the battery,
   wherein the controller controls the driving on-and-off of the second electric motor so as to select either a four-wheel drive mode to drive the main and auxiliary drive wheels or a two-wheel drive mode to drive only the main drive wheel.

4. The hybrid working vehicle according to claim 3, further comprising:

a differential speed detection means for detecting a differential peripheral speed between the main drive wheel and the auxiliary drive wheel, wherein during travel of the hybrid working vehicle in the two-wheel drive mode, when the differential peripheral speed detected by the differential speed detection means exceeds a threshold, the controller supplies electric power from the battery to the second electric motor for driving the auxiliary drive wheel so as to change the four-wheel drive mode to the two-wheel drive mode.

5. The hybrid working vehicle according to claim 3, further comprising:

an auxiliary clutch interposed between the second electric motor and the auxiliary drive wheel, wherein the auxiliary clutch is disengaged when the electric power supply to the second electric motor is stopped.

6. The hybrid working vehicle according to claim 5, wherein the auxiliary clutch is a one-way clutch.

7. The hybrid working vehicle according to claim 5, wherein the auxiliary clutch is a bi-directional clutch that can be operated regardless of whether the auxiliary drive wheel rotates in the forward traveling direction or the backward traveling direction.

8. The hybrid working vehicle according to claim 3, wherein the auxiliary drive wheel is steerable, wherein the hybrid working vehicle further comprises:

a turn angle detection means for detecting a turn angle of the auxiliary drive wheel, and wherein, when the turn angle of the auxiliary drive wheel detected by the turn angle detection means exceeds a threshold, the controller commands the second electric motor to increase the output rotary speed so as to make a peripheral speed of the auxiliary drive wheel exceed a peripheral speed of the main drive wheel.

* * * * *